United States Patent
Arakawa et al.

(10) Patent No.: US 10,449,971 B2
(45) Date of Patent: Oct. 22, 2019

(54) TRAVEL CONTROL DEVICE

(71) Applicant: HONDA MOTOR CO., LTD., Tokyo (JP)

(72) Inventors: Ryohsaku Arakawa, Wako (JP); Kei Oshida, Wako (JP); Haruhiko Nishiguchi, Wako (JP); Daisuke Kubota, Wako (JP); Idhsada Sanguanwongthong, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 77 days.

(21) Appl. No.: 15/598,445

(22) Filed: May 18, 2017

(65) Prior Publication Data

US 2017/0334460 A1    Nov. 23, 2017

(30) Foreign Application Priority Data

May 23, 2016  (JP) ................. 2016-102578

(51) Int. Cl.
*B60W 50/14* (2012.01)
*B60W 30/18* (2012.01)
(Continued)

(52) U.S. Cl.
CPC ...... *B60W 50/14* (2013.01); *B60W 30/18163* (2013.01); *G02B 27/01* (2013.01);
(Continued)

(58) Field of Classification Search
CPC ........... B60W 50/14; B60W 30/18163; B60W 30/025; B60W 2050/146; B60W 2420/403; B60W 2420/42; B60W 2420/52; B60W 2550/10; G02B 27/01; G02B 2027/0138; G02B 2027/014
See application file for complete search history.

(56) References Cited

U.S. PATENT DOCUMENTS

2013/0151145 A1*  6/2013  Ishikawa ............ G01C 21/3667
                                                                701/428
2014/0297181 A1* 10/2014  Kondo ............... G01C 21/3658
                                                                701/532
(Continued)

FOREIGN PATENT DOCUMENTS

CN      103162691 A     6/2013
CN      103827635 A     5/2014
(Continued)

OTHER PUBLICATIONS

Office Action dated Mar. 20, 2018, issued in counterpart Japanese Application No. 2016-102578, with English translation (6 pages).
(Continued)

*Primary Examiner* — Sze-Hon Kong
(74) *Attorney, Agent, or Firm* — Westerman, Hattori, Daniels & Adrian, LLP

(57) ABSTRACT

In a case where automatic lane change control is performed, a traveling lane and another lane as a lane change destination are displayed on a display unit based on lane change information, and a guide indication of a lane change starting position or a lane change finishing position is displayed on the displayed traveling lane or the displayed another lane.

9 Claims, 8 Drawing Sheets

(51) Int. Cl.
*G02B 27/01* (2006.01)
*B60W 30/02* (2012.01)

(52) U.S. Cl.
CPC ..... *B60W 30/025* (2013.01); *B60W 2050/146* (2013.01); *B60W 2420/403* (2013.01); *B60W 2420/42* (2013.01); *B60W 2420/52* (2013.01); *B60W 2550/10* (2013.01); *G02B 2027/014* (2013.01); *G02B 2027/0138* (2013.01)

(56) References Cited

U.S. PATENT DOCUMENTS

| | | | |
|---|---|---|---|
| 2015/0204687 A1 | 7/2015 | Yoon et al. | |
| 2016/0225261 A1* | 8/2016 | Matsumoto | G08G 1/167 |
| 2016/0252363 A1* | 9/2016 | Tertoolen | G01C 21/3635 |
| | | | 701/410 |
| 2016/0304126 A1* | 10/2016 | Yamaoka | B62D 15/0255 |
| 2017/0008522 A1* | 1/2017 | Sato | B60W 10/04 |
| 2017/0036678 A1* | 2/2017 | Takamatsu | B60W 10/04 |
| 2017/0113686 A1* | 4/2017 | Horita | B60W 50/14 |
| 2017/0183013 A1* | 6/2017 | Matsumoto | B60W 30/18163 |
| 2017/0210394 A1* | 7/2017 | Yamada | B60W 50/10 |
| 2017/0235135 A1* | 8/2017 | Ishiguro | B60K 35/00 |
| | | | 345/633 |
| 2017/0240184 A1* | 8/2017 | Kluever | B60W 30/12 |
| 2017/0341652 A1* | 11/2017 | Sugawara | B60W 50/14 |
| 2018/0086346 A1* | 3/2018 | Fujisawa | B60Q 3/18 |
| 2018/0099676 A1* | 4/2018 | Goto | B60W 30/10 |
| 2018/0188735 A1* | 7/2018 | Sugawara | B60W 30/095 |
| 2018/0225975 A1* | 8/2018 | Park | B60W 50/14 |
| 2018/0273089 A1* | 9/2018 | Isomoto | B62D 6/001 |
| 2018/0297611 A1* | 10/2018 | Fujisawa | B60W 50/14 |
| 2018/0354517 A1* | 12/2018 | Banno | B60W 50/14 |
| 2019/0077411 A1* | 3/2019 | Oishi | B60W 50/02 |

FOREIGN PATENT DOCUMENTS

| | | |
|---|---|---|
| CN | 103842774 A | 6/2014 |
| CN | 105292103 A | 2/2016 |
| JP | 2001-10431 A | 1/2001 |
| JP | 2013-96912 A | 5/2013 |
| JP | 2016-2892 A | 1/2016 |
| JP | 2016-17758 A | 2/2016 |

OTHER PUBLICATIONS

Search Report dated Mar. 4, 2019, issued in CN Application No. 2017102835682, with English translation. (2 pages).

Office Action dated Mar. 14, 2019, issued in counterpart CN Application No. 201710283568.2, with English translation. (13 pages).

* cited by examiner

TRAVEL CONTROL DEVICE

CROSS REFERENCES TO RELATED APPLICATIONS

The present application claims priority under 35 U.S.C. § 119 to Japanese Patent Application No. 2016-102578, filed May 23, 2016, entitled "Travel Control Device." The contents of this application are incorporated herein by reference in their entirety.

TECHNICAL FIELD

The present disclosure relates to a travel control device that controls an automatic lane change of a vehicle.

BACKGROUND

For example, Japanese Unexamined Patent Application Publication No. 2001-10431 discloses a parking support device for a vehicle, the parking support device performing support in a driving operation for a driver of the vehicle which performs parallel parking.

In the parking support device, a movement prediction curve of the vehicle is displayed, and a superimposed display of a guideline (guide information) that indicates a returning timing for steering is further performed on an information display, based on an image that is acquired by a rear imaging camera and a steering angle that is detected by a steering angle sensor.

A description is made that the driver may perform the driving operation for parallel parking while watching two indications of the movement prediction curve and the guideline (the paragraph [0007] and FIG. 4 in Japanese Unexamined Patent Application Publication No. 2001-10431).

SUMMARY

In recent years, a vehicle has been suggested which is capable of an automatic lane change in which the vehicle is automatically guided from a traveling lane to another lane as a lane change destination.

In such a vehicle which is capable of the automatic lane change, in a case where the vehicle attempts to perform the automatic lane change, the vehicle moves in a direction in which the vehicle departs from the lane on which the vehicle has been traveling until then.

However, it is possible that a driver or a passenger may feel awkwardness because they are not clear about where the subject vehicle is headed at a time point when movement is started in the direction in which the subject vehicle departs.

It is desirable to provide a travel control device that is capable of reducing awkwardness experienced by a driver or a passenger in a case where automatic lane change control is performed from a lane as a lane change origin to another lane as a lane change destination.

A travel control device according to one aspect of the present disclosure is a travel control device including: a lane change control unit that automatically guides a vehicle from a traveling lane to another lane as a lane change destination; a display unit; and a display control unit that performs a guide indication for a lane change on the display unit based on lane change information from the lane change control unit. The display control unit displays the traveling lane and the lane as the lane change destination on the display unit based on the lane change information and performs the guide indication of a starting position of the lane change or a finishing position of the lane change on the displayed lane.

In the aspect of the present disclosure, for example, in a case where the vehicle is automatically guided from the traveling lane to the lane as the lane change destination, the traveling lane and the lane as the lane change destination are displayed on the display unit based on the lane change information, and the guide indication of the starting position of the lane change or the finishing position of the lane change is performed on the displayed lane. Accordingly, the guide indication may reduce awkwardness that is experienced by the driver or the passenger in a case where the automatic lane change control is performed.

Because the driver or the passenger may know where the subject vehicle is headed before the time point when the subject vehicle starts moving in a direction of departure, the possibility that awkwardness occurs may be reduced.

In this case, the travel control device preferably further includes a real image acquisition unit that acquires a real image by imaging a lane on which a subject vehicle travels and the lane as the lane change destination that neighbors the lane on which the subject vehicle travels. The lane change control unit preferably automatically generates a track of the lane change of the subject vehicle based on the acquired real image and preferably automatically performs the lane change in response to the generated track of the lane change, and the display control unit preferably displays the acquired real image or a computer graphic image that includes at least a lane mark based on the real image on the display unit and preferably performs the guide indication of the starting position of the lane change or the finishing position of the lane change, which is generated by the lane change control unit, on the lane mark in the real image or the lane mark in the computer graphic image that is displayed on the display unit.

In such an aspect of the present disclosure, for example, in a case where the vehicle is automatically guided from the traveling lane to the lane as the lane change destination, the real image or the computer graphic image is displayed on the display unit, and the guide indication of the starting position of the lane change or the finishing position of the lane change, which is generated by the lane change control unit is performed on the lane mark in the real image or the lane mark in the computer graphic image that is displayed on the display unit. Accordingly, awkwardness that is experienced by the driver or the passenger in a case where the automatic lane change control is performed may be reduced.

The display control unit may perform a lane keeping guide indication from a corresponding position to a time when a direction indicator starts blinking to the starting position of the lane change on the display unit that displays the lane mark.

In such an aspect of the present disclosure, for example, the lane keeping guide indication from the corresponding position to the time when the direction indicator starts blinking to the starting position of the lane change is performed on the lane mark that is displayed on the display unit. Accordingly, the driver or the passenger may more quickly and certainly recognize the lane change control that is soon executed and thus may further reduce awkwardness.

Further, the display control unit may display the lane keeping guide indication to be swayed to a change destination lane side.

The lane keeping guide indication is displayed to be swayed to the change destination lane side. Accordingly, awkwardness may further be reduced.

Further, the display control unit may perform the lane keeping guide indication on the lane as the lane change destination on a back side in a screen of the finishing position of the lane change on the display unit that performs the guide indication of the finishing position of the lane change on the lane as the lane change destination.

In such an aspect of the present disclosure, for example, because the lane keeping guide indication is performed on the lane as the lane change destination on a back side in the screen of the finishing position of the lane change, the whole track of the automatic lane change may be visually recognized on the screen, and awkwardness may be relieved.

Furthermore, the travel control device may further include a reporting device that includes the display unit. In a case where a driver operates a direction indication operating element and where the lane change control unit assesses that automatically performing the lane change is not feasible or where the lane change control unit determines that continuing the lane change is not appropriate after the lane change is started, the reporting device may report an assessment result that starting or continuing the automatic lane change is not feasible.

In such an aspect of the present disclosure, for example, in a case where the lane change control unit detects an operation of the direction indication operating element but assesses that automatically performing the lane change is not feasible or determines that continuing the lane change is not appropriate after the lane change is started, the reporting device reports an assessment result that the lane change may not be started or continued. Accordingly, awkwardness of the driver may be reduced.

Further, the lane change control unit preferably automatically generates a track for returning to a change origin lane in a case where a reason why automatically performing the lane change is not feasible is detected after a track of the lane change of a subject vehicle is automatically generated and the starting position of the lane change or the finishing position of the lane change is displayed on the display unit, and the display control unit preferably performs the guide indication for returning to the change origin lane on the display unit that displays the lane mark in a case where the track for returning to the change origin lane is automatically generated.

In such an aspect of the present disclosure, for example, in a case where a reason why automatically performing the lane change is not feasible is detected after the track of the lane change is generated, the guide indication for returning to the change origin lane is performed. Accordingly, awkwardness that is experienced by the driver or the passenger in a case where the automatic lane change control is performed may be reduced.

BRIEF DESCRIPTION OF THE DRAWINGS

The advantages of the disclosure will become apparent in the following description taken in conjunction with the following drawings.

DETAILED DESCRIPTION

A preferable embodiment of a travel control device according to the present disclosure will hereinafter be raised and described in detail with reference to the attached drawings.

[Configuration]

Figure 1:
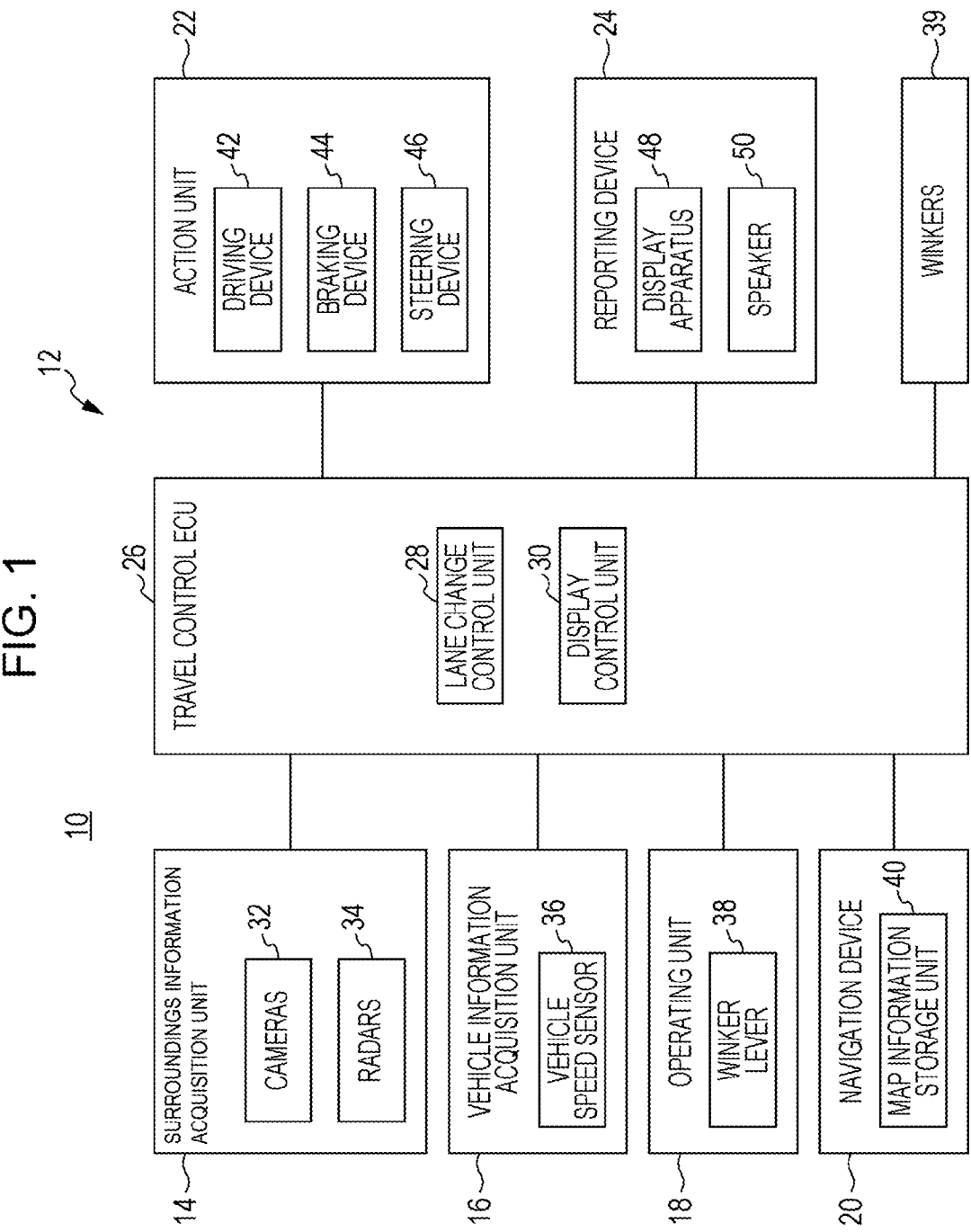
FIG. 1 is a block diagram that illustrates a schematic configuration of a vehicle in which a travel control device according to this embodiment is installed.

FIG. 1 is a block diagram that illustrates a schematic configuration of a vehicle 10 (hereinafter also referred to as "subject vehicle 10") in which a travel control device 12 according to this embodiment is installed.

The vehicle 10 may be switched into an automated driving (including automated driving support) vehicle or a manual driving vehicle. The vehicle 10 in this embodiment functions as the automated driving (including the automated driving support) vehicle.

The travel control device 12 basically includes a surroundings information acquisition unit 14, a vehicle information acquisition unit 16, an operating unit 18, a navigation device 20, an action unit 22, a reporting device 24, winkers 39 as direction indicators (direction indication lamps), and a travel electronic control device 26 (hereinafter referred to as "travel control electronic control unit (ECU) 26").

The travel control ECU 26 is a calculation apparatus that includes a microcomputer, has a central processing unit (CPU), a ROM (including an EEPROM) as a memory, and a random access memory (RAM), in addition, input-output devices such as an A-D converter and a D-A converter, a timer as a time counter, and so forth, and functions as various kinds of function realizing units (function realizing measures) by reading out and executing programs, which are recorded in the ROM, by the CPU. Note that the various function realizing units may be configured with function realizing apparatuses implemented by hardware such as circuitry.

In this embodiment, the travel control ECU 26 is configured with a lane change control unit 28 and a display control unit 30.

The surroundings information acquisition unit 14 includes plural cameras 32 and plural radars 34. The camera 32 (imaging unit) is a solid-state camera that uses solid-state imaging element such as a CCD camera or a CMOS camera (which may be an infrared camera), for example, acquires a surroundings image (real image) of surroundings of the vehicle 10, which includes at least a front of the vehicle 10, and outputs signals that correspond to the surroundings image (image signal) to the travel control ECU 26.

Here, the surroundings image of the surroundings of the vehicle 10 includes images of other vehicles (obstacles) and so forth in addition to lane mark images that form the lanes.

The plural cameras 32 are formed with a camera for imaging the front, cameras for imaging the sides, and a camera for imaging the rear, for example.

The radar 34 outputs transmission waves as electromagnetic waves (here, millimeter waves) to the outside that includes at least the front of the vehicle 10 and receives a reflected wave among the transmission waves, which is reflected by a detected object (for example, another vehicle, a pedestrian, or the like) and returns. Then, a signal that corresponds to the reflected wave (referred to as a radar signal or a reflection signal) is output to the travel control ECU 26.

The plural radars 34 are formed with a radar for front detection, radars for side detection, and a radar for rear detection, for example.

Here, the radar signal includes obstacle information (bearing information, distance information, or relative speed information) or the like about an obstacle such another vehicle.

The vehicle information acquisition unit 16 includes various sensors and various devices that acquire vehicle action information which are requested for lane keeping control and lane change control. Specifically, the vehicle information acquisition unit 16 includes, in addition to a vehicle speed sensor 36 that detects a vehicle speed of the vehicle 10, an acceleration sensor, a yaw rate sensor, a steering angle sensor, and so forth, which are not illustrated. Each of the sensors and each of the devices output acquired vehicle information to the travel control ECU 26.

The operating unit 18 includes a winker lever 38 (direction indication operating element). When the winker lever 38 is operated by the driver, the winker lever 38 causes the left or right winker 39 of the vehicle 10 to blink through the travel control ECU 26. The winker 39 may be caused to manually blink and to be turned off in response to the operation of the winker lever 38 by the driver and may be caused to automatically blink and to be turned off by the lane change control unit 28.

The navigation device 20 detects the present position of the vehicle 10 by using a satellite device such as global positioning system (GPS) device or the like and guides a user (vehicle passenger) about a route to a destination. Further, the navigation device 20 has a map information storage unit 40 that stores map information. The navigation device 20 detects the present position of the vehicle 10 based on position information from GPS satellites and the map information that is stored in the map information storage unit 40.

In view of detection of the present position of the vehicle 10, the navigation device 20 may be considered as one of the vehicle information acquisition unit 16. Further, the navigation device 20 may be considered as the surroundings information acquisition unit 14 that detects surroundings situation information, which is information about a surroundings situation in which the vehicle 10 is involved such as road traffic laws and road regulations in the surroundings of the present position of the vehicle 10.

In FIG. 1, the navigation device 20 that is mounted on the vehicle 10 is assumed to be used. However, embodiments are not limited to this, but a portable information terminal such as a smartphone that is capable of mutual communication with the travel control ECU 26 may be used as the navigation device 20. Further, the map information may be stored in an external server (not illustrated) and may thereby be provided to the navigation device 20 as necessary.

The action unit 22 includes a driving device 42, a braking device 44, and a steering device 46 that act in accordance with control instructions which are output from the lane change control unit 28 of the travel control ECU 26.

The driving device 42 includes a drive source such as an engine or a motor and a drive source ECU (both not illustrated). The drive source ECU causes the drive source to act in accordance with an acceleration instruction or a vehicle speed maintaining instruction that is output from the travel control ECU 26. The braking device 44 includes a brake and a brake ECU (both not illustrated). The brake ECU causes the brake to act in accordance with a deceleration instruction that is output from the travel control ECU 26. The steering device 46 includes an electric power steering and a steering ECU (both not illustrated). The steering ECU causes a motor of the electric power steering to act in accordance with a steering instruction that is output from the travel control ECU 26.

The reporting device 24 includes a display apparatus 48, a speaker 50, and a reporting ECU (not illustrated). The reporting ECU causes the display apparatus 48 and the speaker 50 to act in accordance with a reporting instruction that is output from the travel control ECU 26. The display apparatus 48 performs display about automated driving or the like. The display apparatus 48 may be configured as a portion of a meter of an instrument panel, which is not illustrated, for example. The display apparatus 48 may also be used as the display unit of the navigation device 20. In addition, the display apparatus 48 may be used as a head-up display device that displays an information image in front of a windshield.

The lane change control unit 28 performs control that is required for travel of the vehicle 10 by the automated driving by, for example, outputting, to the action unit 22, an action signal for automatically guiding the subject vehicle 10 from a traveling lane (the lane as a lane change origin) to the lane as a lane change destination.

For example, the lane change control unit 28 generates lane change information that includes a lane change track based on the vehicle information that is acquired by the vehicle information acquisition unit 16 and indicates the state of the vehicle 10 or information that is obtained based on the vehicle information and the information about the surroundings situation of the vehicle 10 that is acquired by the surroundings information acquisition unit 14, controls the winker 39, the driving device 42, the braking device 44, and the steering device 46 based on the generated lane change information, and thereby performs automatic lane change control of the vehicle 10.

The display control unit 30 performs a guide indication for the lane change on the display apparatus 48 based on the lane change information that is generated by the lane change control unit 28.

The display control unit 30 causes the real image acquired by the camera 32 or an image by computer graphics (CG) that is generated by the display control unit 30 to be displayed on the display apparatus 48 in a case where the guide indication for the lane change is performed.

The display control unit 30 performs a synthesized display in which the guide indication by a CG image of the lane change is superimposed on the real image in a case where the real image is displayed.

In a case where a full-CG image comprised of only a CG image is displayed by the display apparatus 48, the display control unit 30 generates a CG image that includes at least lane marks based on the real image or a CG image that includes at least the lane marks based on the map information stored in the map information storage unit 40 and performs a display of a synthesized CG image in which the guide indication for the lane change is superimposed on the generated CG image. In a case where the display of the CG image is performed, a synthesized display is performed in which another vehicle or the like is superimposed, as an animation image, in a position acquired by the surroundings information acquisition unit 14.

[Operation]

Figure 2:
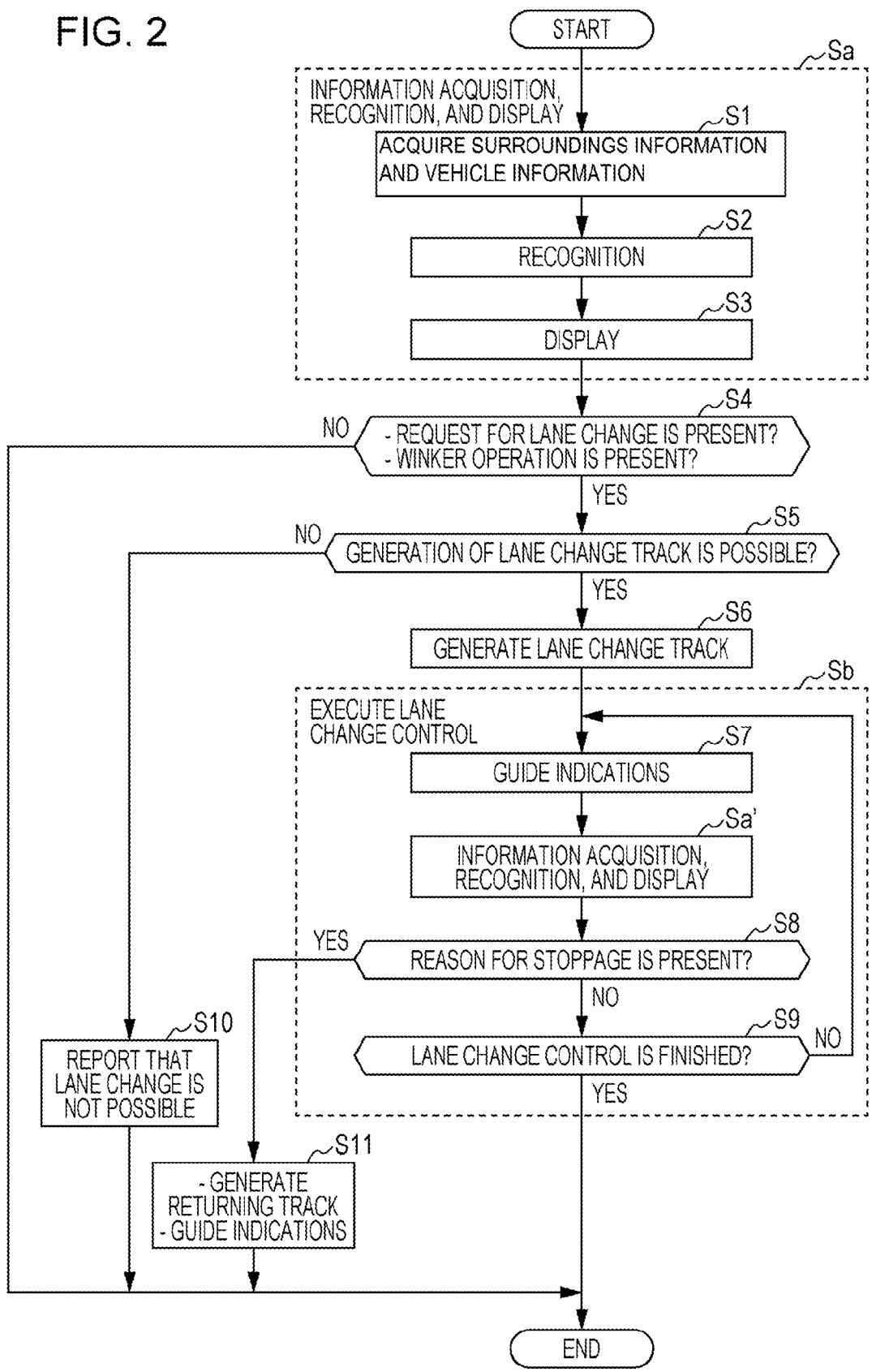
FIG. 2 is a flowchart that is provided for an action explanation of the travel control device according to this embodiment.

An operation of the vehicle 10 in which the travel control device 12 basically configured as described above is installed will be described based on display control in a case of the lane change and with reference to a flowchart in FIG. 2. An execution subject of a program of the flowchart is (the CPU of) the travel control ECU 26. However, mentioning the travel control ECU 26 as the execution subject for each process may leads to complication of description, and the travel control ECU 26 will be mentioned as necessary.

In step S1, the travel control ECU 26 acquires the image signals that have the image information of the surroundings situations which are imaged by the cameras 32 through the surroundings information acquisition unit 14 and the reflection signals that have the obstacle information such as information of other vehicles in the surroundings through the radars 34. The travel control ECU 26 simultaneously acquires a vehicle state such as a vehicle speed Vs through the vehicle speed sensor 36 of the vehicle information acquisition unit 16.

In step S2, the lane change control unit 28 recognizes the surroundings information such as the lane marks in the front of the vehicle from the image signals and the surroundings information of the obstacles and so forth such as other vehicles in the front, sides, and rear of the vehicle. Note that the lane mark is a mark that indicates a lane border (lane demarcation). The lane marks include a continuous line formed with broken white lines (line segments) that are provided at intervals (also referred to as a deemed continuous line) and a continuous line such as a solid white line, in addition, continuous marks formed with Botts' dots, cat's eyes, or the like (which may be considered as the deemed continuous line). Further, the lane change control unit 28 recognizes the positions (bearings and distances), relative speeds, and so forth of the obstacles such as other vehicles in the surroundings from the image signals that are imaged by the cameras 32, the reflection signals that are acquired by the radars 34, the vehicle speed Vs that is acquired by the vehicle speed sensor 36, and so forth.

Figure 3:
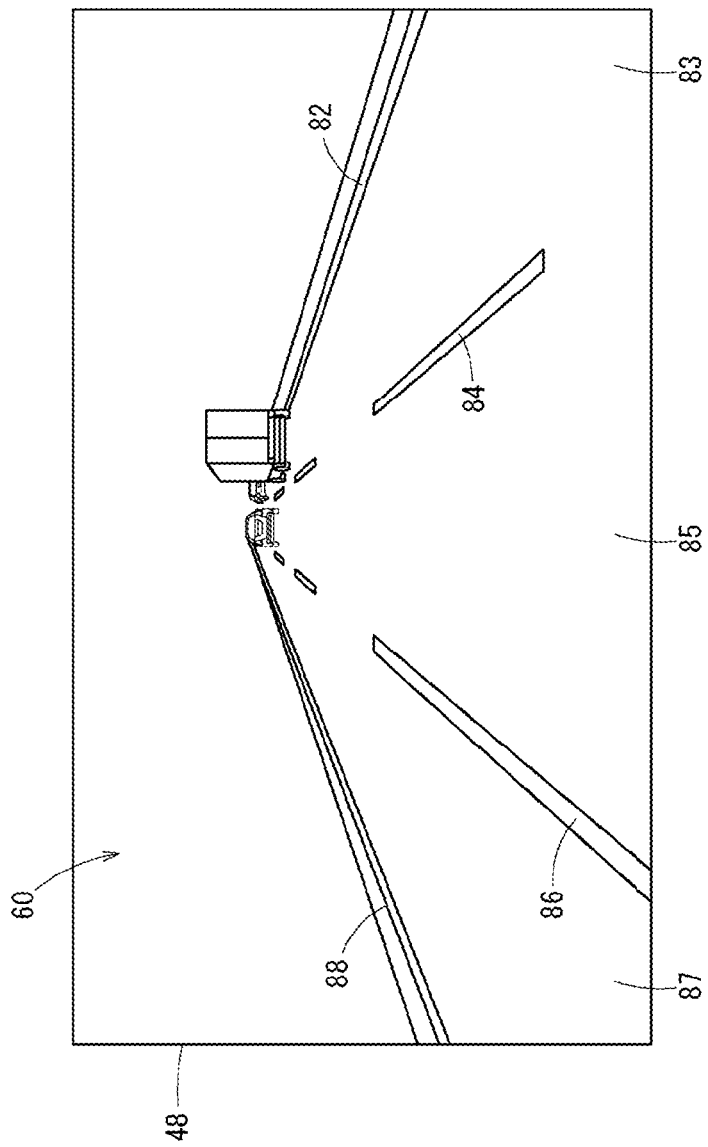
FIG. 3 is an explanatory diagram of displayed image at a time before a lane change starts.

In step S3, on the display apparatus 48, the display control unit 30 displays a real image (actual image) 60 by the camera 32 for imaging the front, which is acquired in step S1, as illustrated in FIG. 3 or displays a CG image (not illustrated) of the front of the vehicle based on the lane marks and the obstacles such as other vehicles, which are recognized from the real image 60 in step S2, that is, a CG image that is generated from a lane mark CG image and an other-vehicle CG image.

A lane change control process will be described below based on the real image 60. However, the CG image may be used instead. In a case of generating the CG image, the lane mark CG image may also be generated based on the map information stored in the map information storage unit 40 and subject vehicle position information by the navigation device 20.

A combination of the processes of steps S1, S2, and S3 will be referred to as step Sa for performing information acquisition, recognition, and display processes.

Next, in step S4, the lane change control unit 28 assesses whether or not a request or necessity for the lane change as a premise of execution of the lane change is present or whether or not an operation of the winker lever 38 is performed.

As for whether or not the request for the lane change is present, for example, the request is assessed as present (step S4: YES) in a case where the subject vehicle 10 approaches a preceding vehicle that travels on the same lane by a prescribed distance or closer. Further, also in a case where the driver operates the winker lever 38 and the winker 39 blinks, the assessment in step S4 is affirmative (step S4: YES). In a case where the request of the lane change is assessed as not present and where the operation of the winker lever 38 is not detected either (step S4: NO), the present process is finished, and the process returns to step Sa.

Here, a description will be made about an automatic lane change by the lane change control unit 28 in a case where although the operation of the winker lever 38 by the driver is not performed, the request of the lane change is assessed as present in step S4.

In a case where the affirmative assessment (step S4: YES) is made in step S4, in step S5, the lane change control unit 28 assesses whether or not generation of a lane change track Tcom is possible.

In the assessment in step S5, based on the image signals by the cameras 32, the reflection signals by the radars 34, and the vehicle speed Vs by the vehicle speed sensor 36, which are acquired in step S1, whether another vehicle is not present in surrounding position where the subject vehicle may cause contact in a case where the lane change is performed, whether plural lanes are present, whether an obstacle such as a fallen object is not present in the lane as the lane change destination, and so forth are assessed by recognition results in step S2. In a case where the assessments are all affirmative, generation of a lane change track is assessed as possible (step S5: YES).

In a case where the operation of the winker lever 38 is detected in step S4 (step S4: YES) and generation of the lane change track is thereafter assessed as not possible (step S5: NO), in step S10, a fact that the lane change is not possible is displayed on the display apparatus 48 or notified by sound from the speaker 50, the present process is finished, and the process returns to step S1.

In a case where generation of the lane change track is assessed as possible (step S5: YES), in step S6, lane change information Flane that includes the lane change track Tcom of the automatic lane change, which is illustrated in FIG. 4, is generated.

As for the lane change track Tcom of the automatic lane change, for example, the vehicle speed Vs which is detected by the vehicle speed sensor 36 is taken into account so that a lateral G applied to the vehicle 10 in the lane change is equal to or lower than an appropriate value, and the present position of the subject vehicle 10 that is traveling on a lane 85 is set as the origin O. Then, the position coordinates (x, y) of a reaching position Ptar on a neighboring lane 87, to which the vehicle 10 is finally to reach across a lane mark (lane borderline) 86, and a smooth lane change track Tcom along the reaching position Ptar that is specified by the position coordinates (x, y) are generated by the lane change control unit 28 that functions as a track generation unit by using a polynomial, a spline curve, and so forth, for example.

Figure 4:
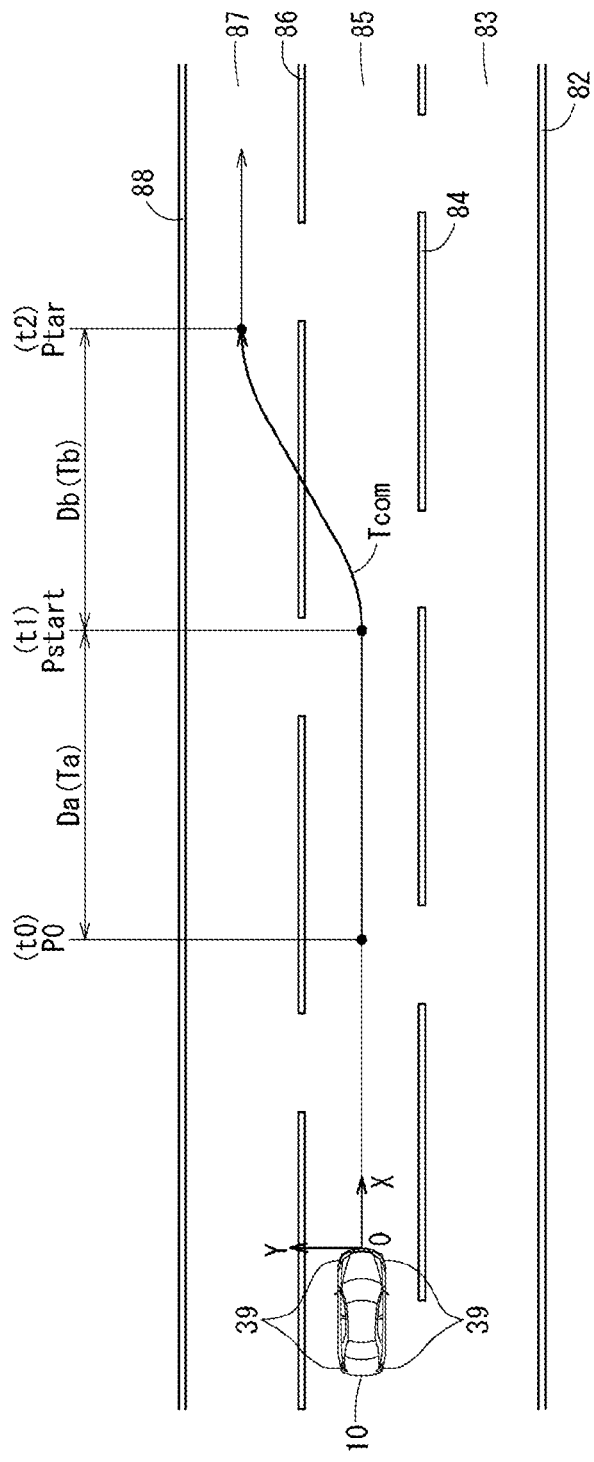
FIG. 4 is an explanatory diagram of a lane change track that is automatically generated.

Note that in FIG. 4, the X axis represents the vehicle longitudinal direction of the vehicle 10, and the Y axis represents the vehicle width direction of the vehicle 10.

The lane change information Flane includes information of a position P0 at a time point t0 when automatic blinking of the left winker 39 is started, in addition to the lane change track Tcom of the automatic lane change.

Further, the lane change information Flane includes information of a lane change starting position (lane change steering starting position) Pstart at a time point t1 that is later by a predetermined time provided by laws or the like, for example, three seconds later than the position P0, that is, information of a steering starting position for the automatic lane change.

In addition, the lane change information Flane includes information of a finishing position (reaching position) Ptar of the lane change, in which the vehicle 10 moves across the lane mark (lane borderline) 86, automatic blinking of the winker 39 is canceled and turned off at a time point t2, and the steering is returned to the straight direction.

A time Ta that corresponds to a distance (lane keeping distance) Da from the position P0 to the lane change starting position Pstart will be referred to as a lane keeping time Ta before actually starting steering (before starting the lane change), which is provided by laws or the like. A time Tb that corresponds to a distance (lane change distance) Db from the lane change starting position Pstart to the lane change finishing position (reaching position) Ptar will be referred to as a lane change time Tb.

As it may be understood from FIG. 4, the lane 85 on which the subject vehicle 10 is presently traveling is famed with a lane mark (lane borderline) 84 close to a lane 83 on a median strip side and the lane mark (lane borderline) 86 close to the lane 87 on a roadside side. The neighboring lane 87 that is the lane as the lane change destination is formed with the lane borderline 86 and a lane mark 88. In this embodiment, a description is made with an example where the vehicle 10 keeps to the right.

Next, in step Sb, a series of processes of the lane change control that causes the action unit 22 to act is executed based on the above lane change information Flane.

Figure 5:
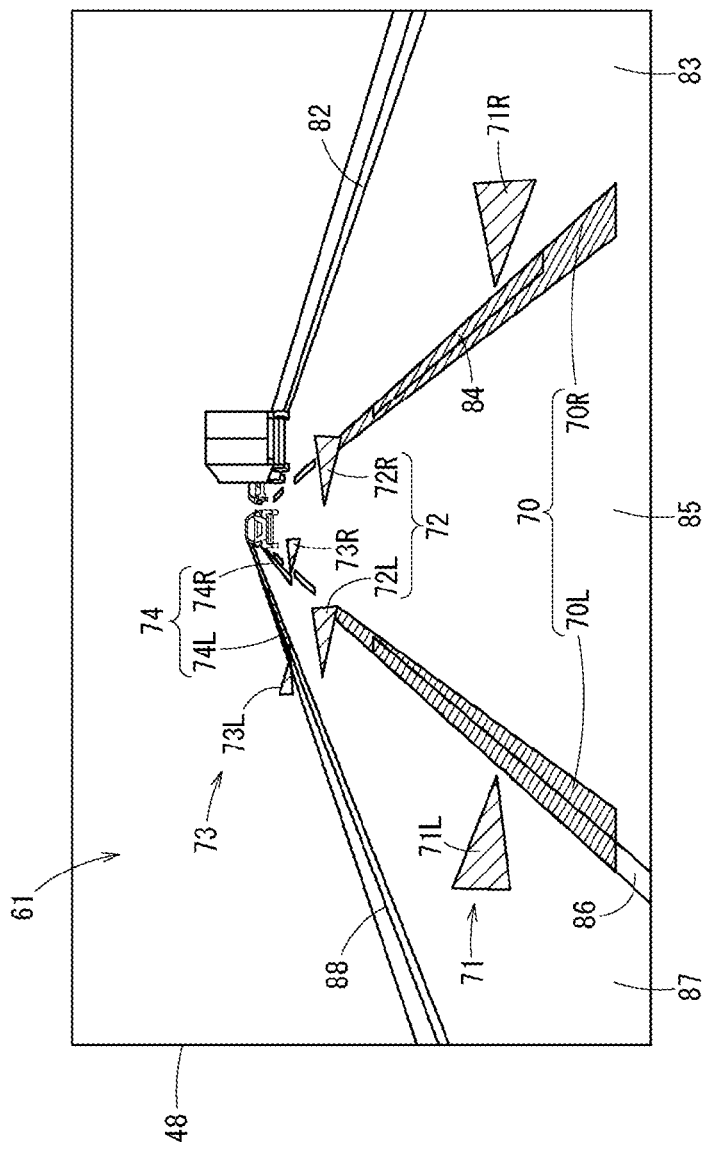
FIG. 5 is an explanatory diagram of guide indications of a starting position, a finishing position, and lane keeping in the lane change.

In this case, first in step S7, as illustrated in FIG. 5, an image 61 in which guide information is translucently drawn (hatched parts) in green which indicates safety, for example, and is superimposed on the real image 60 (see FIG. 3) on the display apparatus 48 (an image in which the guide indications for the lane change is superimposed on the real image 60) is displayed.

In the image 61, the traveling lane 85 and the lane 87 as the lane change destination are displayed based on the lane change information Flane. Further, on the displayed lanes 85 and 87, guide indications 72 (72L and 72R) of the lane change starting position Pstart and guide indications 73 (73L and 73R) of the lane change finishing position Ptar are displayed.

In the image 61, at the same time, lane keeping guide indications 70 (70L and 70R) from the position P0 where automatic blinking of the winker 39 starts to the lane change starting position Pstart are displayed.

In the image 61, guide indications 71 (71L and 71R) in which vertices of substantially isosceles triangles are displayed to be opposed to each other on the outsides of the lane marks 84 and 86 that form the traveling lane 85 are indications that mean the presently traveling lane 85 (lane keeping indications). The guide indications 71 may be removed.

Here, the guide indications 72 (72L and 72R) of the lane change starting position Pstart, which are displayed in the vicinities of the lane marks 86 and 84 which form the traveling lane 85, are provided as substantially isosceles triangles. The vicinities of the bases are positioned along the lane marks 86 and 84, and the respective vertices are drawn so as to be directed to the lane 87 as the lane change destination.

Further, the guide indications 73 (73L and 73R) of the lane change finishing position Ptar, which are displayed in the vicinities of the lane marks 88 and 86 which form the lane 87 as the lane change destination, are provided as substantially isosceles triangles. The vicinities of the vertices are positioned on the lane marks 88 and 86, and the respective vertices are drawn so as to be directed to a central portion of the lane 87 as the lane change destination.

In addition, the lane keeping guide indications 70 (70L and 70R) from the corresponding position P0 (see FIG. 4) to the time when blinking of the winker 39 starts to the lane change starting position Pstart are respectively drawn along the lane marks 86 and 84. Further, as illustrated in FIG. 5, lane keeping guide indications 74 (74L and 74R) are drawn along the lane marks 88 and 86 that form the lane 87 as the lane change destination on a back side in a screen of the guide indications 73 (73L and 73R) of the lane change finishing position Ptar.

Figure 6:
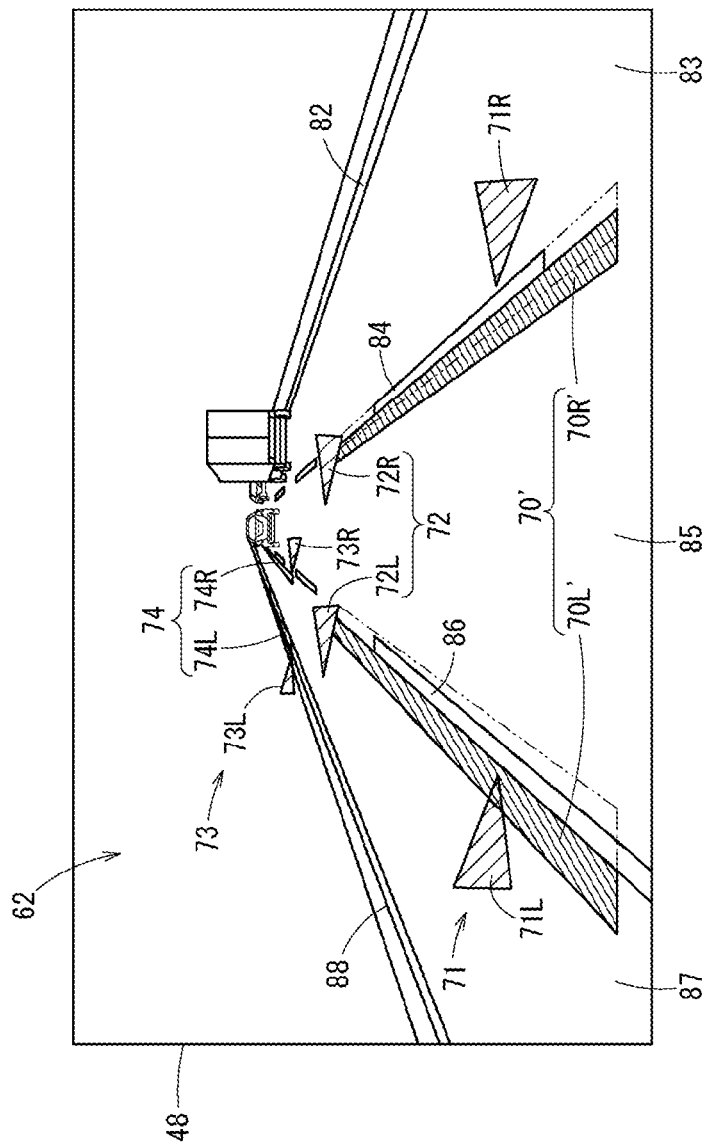
FIG. 6 is an explanatory diagram that illustrates a display in which the guide indications for the lane keeping are offset.

As illustrated as an image 62 (an image in which the guide indications for the lane change of another example are superimposed on the real image 60) in FIG. 6, the display control unit 30 may perform the lane keeping guide indications 70 (70L and 70R) (see FIG. 5) as lane keeping guide indications 70' (70L' and 70R') that are swayed to the change destination lane 87 side.

Next, in step Sa' next to a guide indication process of step S7 during execution of the lane change control, the information acquisition, recognition, and display processes that are equivalent to the processes of above step Sa (the processes of above steps S1, S2, and S3) are executed. In this case also, the image signals that have the image information of the surroundings situations which are imaged by the cameras 32 and the reflection signals that have the information of other vehicles in the surroundings through the radars 34 are acquired, and the vehicle state such as the vehicle speed Vs is acquired through the vehicle information acquisition unit 16 (step S1). Next, the lane change control unit 28 recognizes the lane marks 82, 84, 86, and 88, and the positions, the relative speeds, and so forth of other vehicles in the surroundings (step S2). In addition, the display control unit 30 generates the real image 60 and displays it on the display apparatus 48.

Next, in step S8, whether or not a reason for stoppage of the automatic lane change is present is assessed.

For example, in the process of step Sa', in a case where an obstacle (including a life such as an animal) is detected on the change destination lane 87 or a case where a manual returning operation of the winker lever 38 by the driver is detected during the execution of the lane change control, the reason for stoppage of the automatic lane change is assessed as present (step S8: YES).

Figure 7:
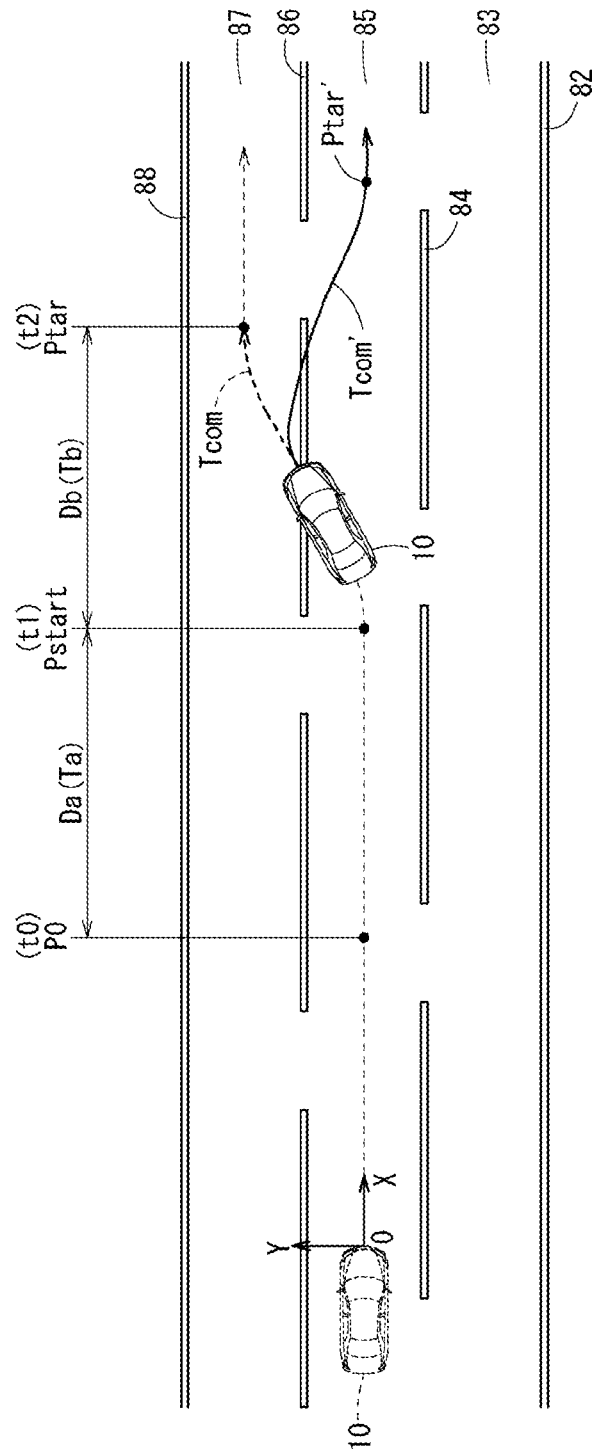
FIG. 7 is an explanatory diagram of a track for returning to a change origin lane.

In a case where the reason for stoppage of the automatic lane change is assessed as present (step S8: YES), in step S11, a track Tcom' for returning to a reaching position Ptar' of the change origin lane 85, which is illustrated in FIG. 7, is automatically generated.

Figure 8:
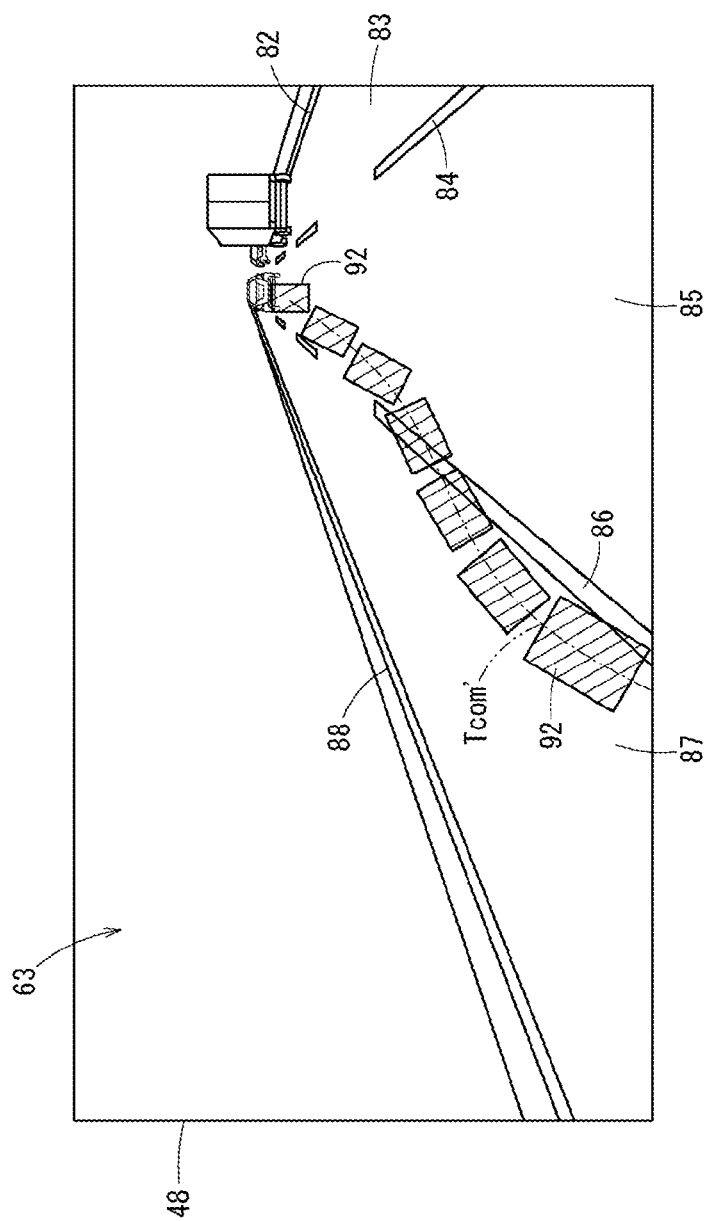
FIG. 8 is an explanatory diagram of the guide indications of the track for returning to the change origin lane.

In a case where the track Tcom' for returning to the change origin lane 85 is automatically generated, as illustrated in an image 63 (an image in which guide indications for returning to the change origin lane 85 are superimposed on the real image) in FIG. 8, guide indications 92 for returning to the change origin lane 85 are performed on the display apparatus 48 that displays the lane marks 82, 84, 86, and 88 (the same step S11). The guide indications 92 are continual indications in which rectangles as target markers are arranged on the returning track Tcom', for example, and which are translucent drawings (hatched parts) in red which expresses warning, for example. In this case, the returning to the change origin lane 85 may together be notified by sound from the speaker 50.

In this case, in order to visually warn that the lane change is not possible, in step S11, the lane mark 86 as a borderline mark that divides the change destination lane 87 from the change origin lane 85 may be drawn in red (in a case of the CG image), or a red line may be drawn on the lane mark 86 in a superimposed manner (in a case of the real image). This warning indication in red is deleted when return of the vehicle 10 to the change origin lane 85 is detected by the travel control ECU 26.

On the other hand, in step S8, in a case where the reason for stoppage of the automatic lane change is assessed as not present (step S8: NO), in step S9, whether or not the subject vehicle 10 reaches the reaching position Ptar on the neighboring lane 87 and the lane change control is finished is assessed. The processes of step S7, step Sa', NO in step S8, and NO in step S9 are repeated until the lane change control process is finished. In a case where the lane change control process is finished (step S9: YES), the present process is finished. The guide indications are removed when the lane change control process is finished or within a prescribed time from the finish.

Conclusion of Embodiment

As described in the foregoing, in a case where the automatic lane change control is performed, the display control unit 30 of the travel control device 12 according to the above-described embodiment displays the traveling lane 85 and the lane 87 as the lane change destination on the display apparatus 48 based on the lane change information Flane and performs the guide indications 72 or 73 of the lane change starting position Pstart or the lane change finishing position Ptar on the displayed lane 85 or 87 (FIG. 6).

The guide indications 72 and 73 are confirmed, and awkwardness that is experienced by the driver or a passenger in a case where the automatic lane change control is performed may thereby be reduced.

That is, because the driver or the passenger may know where the subject vehicle 10 is headed before the time point t1 (FIG. 4) when the subject vehicle 10 starts moving (starts steering) in a direction of departure from the lane 85, the possibility that awkwardness occurs may be reduced.

Further, the lane keeping guide indications 70 (70L and 70R) (FIG. 5) from the corresponding position P0 (FIG. 7) to the time when blinking of the winker 39 starts to the lane change starting position Pstart are performed on the lane marks 84 and 86 that are displayed on the display apparatus 48. Accordingly, the driver or the passenger may more quickly and certainly recognize the lane change control that is soon executed and thus may further reduce awkwardness.

Further, the lane keeping guide indications 70 (70L and 70R) are changed to the lane keeping guide indications 70' (70L' and 70R') (FIG. 6) that are displayed to be swayed to the change destination lane 87 side. Accordingly, awkwardness may further be reduced.

In addition, because the lane keeping guide indications 74 (74L and 74R) are performed on the lane 87 as the lane change destination on a back side in the screen of the lane change finishing position Ptar (FIG. 4), the whole track of the automatic lane change may be visually recognized on the screen, and awkwardness may be relieved.

Further, in a case where the lane change control unit 28 detects an operation of the winker lever 38 (corresponding to step S4) but assesses that automatically performing the lane change is not possible (step S5: NO) or determines that continuing the lane change is not preferable after the lane change is started (step S8: YES), the reporting device 24 (the display apparatus 48 or the speaker 50) reports an assessment result that the lane change may not be started or continued (corresponding to steps S10 and S11). Accordingly, awkwardness of the driver may be reduced.

For example, in a case where a reason why the lane change may not be automatically performed is detected after the lane change track Tcom is generated (step S8: NO), the guide indications 92 (FIG. 8) for returning to the change origin lane 85 are performed. Accordingly, awkwardness that is experienced by the driver or the passenger in a case where the automatic lane change control is performed may be reduced.

Further, while the subject vehicle 10 is traveling, the lane change control unit 28 may appropriately report the driver, through the reporting device 24, that the subject vehicle 10 is in a situation where the lane change is possible in a case where the situation where the lane change is possible occurs, based on the vehicle state acquired by the vehicle information acquisition unit 16 and the surroundings situations acquired by the surroundings information acquisition unit 14.

Further, it is matter of course that the techniques of the present disclosure are not limited to the above-described embodiment but may be carried out in various configurations based on the contents described herein. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A travel control device comprising:
   a lane change controller that automatically guides a vehicle from a traveling lane to another lane as a lane change destination;
   a display device;
   a display controller that displays a guide indication for a lane change on the display device based on lane change information from the lane change controller, wherein the display controller displays the traveling lane and the another lane on the display device based on the lane change information and displays the guide indication including a starting position of the lane change and a finishing position of the lane change simultaneously on the displayed traveling lane and the displayed another lane, respectively; and
   a real image acquisition controller that acquires a real image by imaging the traveling lane on which a subject vehicle travels and the another lane adjacent to the traveling lane,
   wherein
   the lane change controller automatically generates a track of the lane change of the subject vehicle based on the acquired real image and automatically performs the lane change in accordance with the generated track of the lane change, and
   the display controller:
   displays the acquired real image or a computer graphic image that includes at least a lane mark based on the real image on the display device,
   displays the guide indication including the starting position of the lane change and the finishing position of the lane change on the lane mark in the real image or the lane mark in the computer graphic image, displayed on the display device, the starting position of the lane change and the finishing position of the lane change being generated by the lane change controller, and displays a lane keeping guide indication from a position corresponding to a time when a direction indicator starts blinking to the starting position of the lane change on the display device with the displayed lane mark, the lane keeping guide indication indicating to stay in the traveling lane.

2. The travel control device according to claim 1, wherein the display controller displays the lane keeping guide indication shifted toward the another lane.

3. The travel control device according to claim 1, wherein the display controller displays the finishing position of the lane change on the another lane, and further displays a second lane keeping guide indication on the another lane at a position behind the finishing position of the lane change on the display device, the second lane keeping guide indication indicating to stay in the another lane.

4. The travel control device according to claim 1, further comprising:
a reporting device that includes the display device, wherein
in a case where a driver operates a direction indication operating element and where the lane change controller assesses that automatically performing the lane change is not feasible or where the lane change controller determines that continuing the lane change is not appropriate after the lane change is started, the reporting device reports an assessment result that starting or continuing the lane change is not feasible.

5. The travel control device according to claim 1, wherein the lane change controller automatically generates a track for returning to a change origin lane in a case where the lane change controller detects automatically performing the lane change is not feasible after a track of the lane change of a subject vehicle is automatically generated and the starting position of the lane change and the finishing position of the lane change is displayed on the display device, and
the display controller displays the guide indication for returning to the change origin lane on the display device that displays the lane mark in a case where the track for returning to the change origin lane is automatically generated.

6. The travel control device according to claim 1, wherein the display controller displays the guide indication for the lane change on the display device before the lane change controller starts automatic lane change.

7. The travel control device according to claim 1, wherein the lane keeping guide indication has a strip shape extending along the lane.

8. A vehicle control method executed by an on-board computer, the method comprising:
(i) performing a lane change by automatically guiding a vehicle from a traveling lane to another lane as a lane change destination by using a lane change information;
(ii) displaying the traveling lane and the another lane on a display device based on the lane change information and displaying a guide indication including a starting position of the lane change and a finishing position of the lane change simultaneously on the displayed traveling lane and the displayed another lane, respectively;
(iii) acquiring a real image by imaging the traveling lane on which a subject vehicle travels and the another lane adjacent to the traveling lane,
wherein the step (i) automatically generates a track of the lane change of the subject vehicle based on the acquired real image and automatically performs the lane change in accordance with the generated track of the lane change, and
wherein the step (ii):
displays the acquired real image or a computer graphic image that includes at least a lane mark based on the real image on the display device,
displays the guide indication including the starting position of the lane change and the finishing position of the lane change on the lane mark in the real image or the lane mark in the computer graphic image, displayed on the display device, and
displays a lane keeping guide indication from a position corresponding to a time when a direction indicator starts blinking to the starting position of the lane change on the display device with the displayed lane mark, the lane keeping guide indication indicating to stay in the traveling lane.

9. A non-transitory computer readable medium storing a vehicle control program for causing an on-board computer to execute processing, the processing comprising:
(i) performing a lane change by automatically guiding a vehicle from a traveling lane to another lane as a lane change destination by using a lane change information;
(ii) displaying the traveling lane and the another lane on a display device based on the lane change information and displaying a guide indication including a starting position of the lane change and a finishing position of the lane change simultaneously on the displayed traveling lane and the displayed another lane, respectively;
(iii) acquiring a real image by imaging the traveling lane on which a subject vehicle travels and the another lane adjacent to the traveling lane,
wherein the step (i) automatically generates a track of the lane change of the subject vehicle based on the acquired real image and automatically performs the lane change in accordance with the generated track of the lane change, and
wherein the step (ii):
displays the acquired real image or a computer graphic image that includes at least a lane mark based on the real image on the display device,
displays the guide indication including the starting position of the lane change and the finishing position of the lane change on the lane mark in the real image or the lane mark in the computer graphic image, displayed on the display device, and
displays a lane keeping guide indication from a position corresponding to a time when a direction indicator starts blinking to the starting position of the lane change on the display device with the displayed lane mark, the lane keeping guide indication indicating to stay in the traveling lane.

* * * * *